(12) United States Patent
Bicchi et al.

(10) Patent No.: US 7,699,731 B2
(45) Date of Patent: Apr. 20, 2010

(54) MECHANISM OF MOTOR REDUCTION WITH VARIABLE REGIDITY AND RAPIDLY CONTROLLABLE

(76) Inventors: Antonio Bicchi, Via di Gelsi, n. 4, 5400 Massa (IT); Giovanni Tonietti, Via Principe Amedeo, n. 51, 57038 Rio Marina (LI) (IT)

( * ) Notice: Subject to any disclaimer, the term of this patent is extended or adjusted under 35 U.S.C. 154(b) by 779 days.

(21) Appl. No.: 11/250,725

(22) Filed: Oct. 14, 2005

(65) Prior Publication Data

US 2006/0113846 A1 Jun. 1, 2006

(30) Foreign Application Priority Data

Oct. 14, 2004 (IT) .............................. PI2004A0077

(51) Int. Cl.
*B25J 9/02* (2006.01)
*F16H 19/06* (2006.01)

(52) U.S. Cl. .......................................... 474/134; 318/8

(58) Field of Classification Search ................... 310/10; 425/262; 474/134, 141; 482/6; 74/89.29; 318/8, 9; 198/748
See application file for complete search history.

(56) References Cited

U.S. PATENT DOCUMENTS

| | | | | |
|---|---|---|---|---|
| 3,310,998 A | * | 3/1967 | Harmening | 74/661 |
| 3,441,009 A | * | 4/1969 | Rafanelli | 123/90.15 |
| 3,739,252 A | * | 6/1973 | Hays et al. | 318/696 |
| 3,888,217 A | * | 6/1975 | Hisserich | 123/90.31 |
| 3,979,964 A | * | 9/1976 | McCordall | 474/69 |
| 4,141,245 A | * | 2/1979 | Brandstetter | 73/862.46 |
| 4,525,151 A | * | 6/1985 | Tomita et al. | 474/101 |
| 5,134,346 A | * | 7/1992 | Schneider et al. | 318/8 |
| 5,343,999 A | * | 9/1994 | Yoshida et al. | 198/468.11 |
| 5,346,437 A | * | 9/1994 | Chang | 474/134 |
| 5,690,567 A | * | 11/1997 | DeNijs et al. | 474/73 |
| 5,830,094 A | * | 11/1998 | DeNijs | 474/73 |
| 6,155,218 A | * | 12/2000 | Line | 123/90.15 |
| 6,503,163 B1 | * | 1/2003 | Van Sant et al. | 474/101 |
| 2003/0073533 A1 | * | 4/2003 | Knutson | 474/263 |
| 2003/0104886 A1 | * | 6/2003 | Gajewski | 474/87 |
| 2005/0003915 A1 | * | 1/2005 | Dec | 474/135 |

FOREIGN PATENT DOCUMENTS

GB  2391535 A  *  2/2004

* cited by examiner

*Primary Examiner*—Robert A Siconolfi
*Assistant Examiner*—Stephen Bowes
(74) *Attorney, Agent, or Firm*—Ben J. Yorks; Irell & Manella LLP

(57) ABSTRACT

A transmission mechanism between two or more shafts of devices that interact or could possibly interact with people. The transmission mechanism has a particular application to the sector of machines for muscular training and/or rehabilitation, devices for entertainment such as carousels and amusement-park rides, service machines and robots that physically interact with human beings, and industrial robots that operate in close proximity to the operator.

5 Claims, 4 Drawing Sheets

MECHANISM OF MOTOR REDUCTION WITH VARIABLE REGIDITY AND RAPIDLY CONTROLLABLE

REFERENCE TO CROSS RELATED APPLICATION

This application claims priority to Italian Application No. PI/2004/A/000077, filed Oct. 14, 2004.

FIELD OF INVENTION

The present invention relates to a mechanical transmission.

BACKGROUND INFORMATION

As it is well known, the transmission of motion could be implemented using rigid mechanisms, compliant mechanisms with a fixed compliance, or a combination of these.

The rigid transmission mechanisms have the disadvantage of reflecting the overall inertia of the motor part to the impacting part, amplified by the square of the gear ratio. As a consequence, motions that guarantee a level of risk lower than a maximum given threshold are subject to limitations on the maximum admissible velocity in the case of rigid transmission.

Deformable transmission mechanisms with a fixed compliance, with a noticeable and constant damping, are generally obtained through the interposition of an elastic or a viscoelastic element between the motor shaft and the joint shaft, with deliberately high compliance characteristics.

The mechanisms have a disadvantage in that the joint stiffness rigidity can be set only during the task preparation phase (off-line), and not during the execution phase of the same task (on-line).

Another drawback of their mechanisms is that in many applications they cannot be used for the lack of precision in positioning, due to the slowness that characterize the acceleration phases and because of the ease with which oscillations of the elements placed at the end of the transmission are triggered.

For example, there are devices that limit the torque or the force and, when suitably tuned, reduce the maximum opposable resistance in such a way to allow the moving parts to execute the task, but that are also capable of decoupling the moving parts upon the threshold of a given maximum resistance. However, the greatest biological damage in the case of an accident is always determined in the very first instants of impact. Therefore, by also setting the thresholds at the minimum for the task execution, a large amount of damage has already occurred once the limitation of force or rigidity occurs.

Therefore, the need is felt to supply a transmission mechanism with variable stiffness that is also rapidly controllable, and that guarantees safety in the event that the devices interact or could interact with people.

BRIEF SUMMARY OF THE INVENTION

A transmission mechanism of motion from a motor part to a joint part. The joint part is capable of moving from a first position to a second position with a motion that includes an acceleration phase, a substantially uniform motion phase and a deceleration phase. The impedance of the transmission decreases during uniform motion of the joint part.

BRIEF DESCRIPTION OF THE DRAWINGS

The invention will hereby be illustrated with the description of some of its preferable forms, as exemplifying and non limiting examples, with reference to the annexed drawings in which.

DETAILED DESCRIPTION

Figure 1:
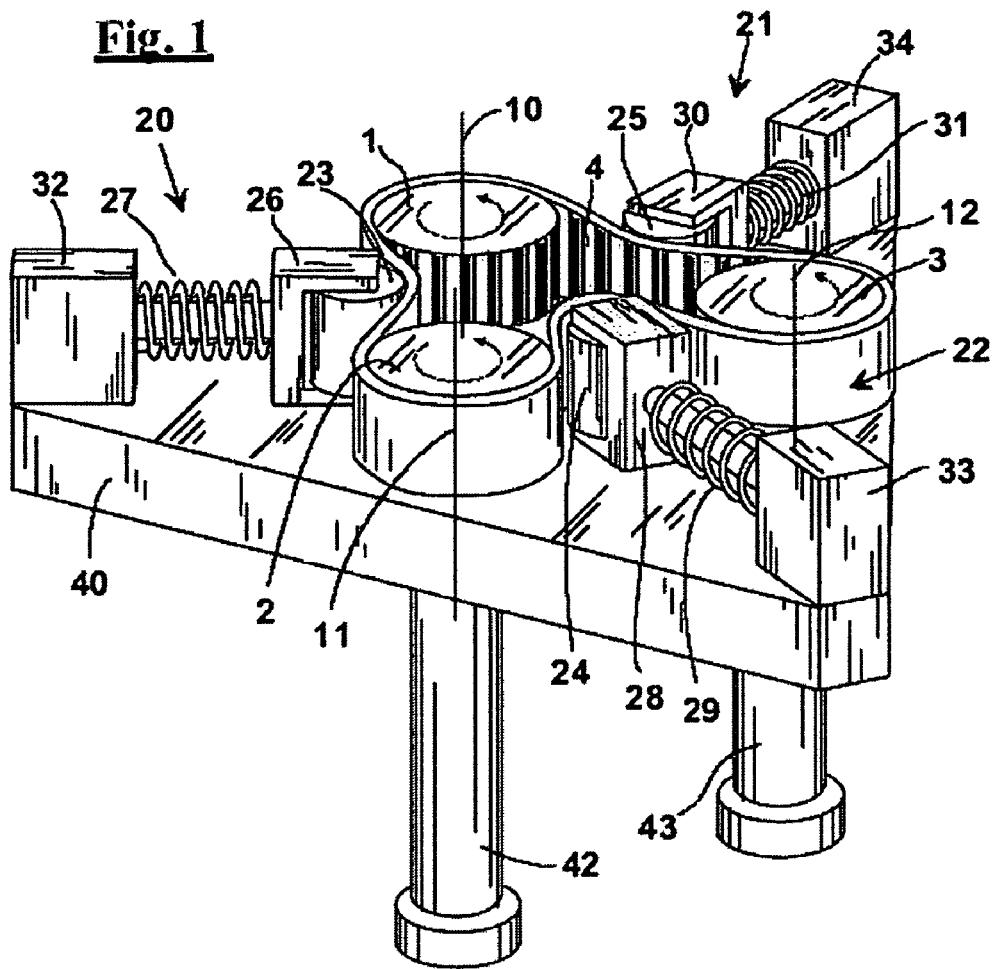
FIG. 1 shows a prospective view of a first preferable form of a transmission mechanism with a variable mechanic impedance.

Disclosed is a mechanism of motion transfer that allows considerable velocities of joint shaft motion, while limiting the maximum level of biological damage in the event of impact of the moving masses with human operators.

The mechanism is intrinsically safe and operates in a purely mechanical and passive way, guaranteeing safe operation regardless any external control action on the main shaft.

A further aim of the present invention is to optimize the times in which the desired motion characteristics are reached, while guaranteeing a risk level below or equal to a specified safety level during the overall motion.

The mechanism provides motion transfer from a main shaft to a joint shaft, in which the joint shaft is allowed to move from a start point to a goal point with a motion which is comprehensive of an acceleration phase, a substantially uniform motion phase, and a decelerating phase, in which the transmission is allowed to reach the desired values of mechanical impedance, characterized by the fact that there are ways to mechanically change continuously the impedance during the various phase of the motion.

Advantageously, the ways for decreasing this mechanical impedance include a second motor part that can either have in-phase motion with the first motor part, therefore reducing the mechanical impedance, or out-of-phase motion with the first motor part, therefore increasing the mechanical impedance.

In particular, both the motor part and the second motor part are controlled independently, in order to obtain control of both the motion and the mechanical impedance of the transmission.

In its preferred realized form, the first motor part and the second motor part both include a rotating motor, a first stage of motion reduction, and a pulley joined to the shaft of the rotating motor.

Preferably, the joint part is a shaft that comprises a joint pulley rigidly coupled with it, with its axis parallel to the axes of the rotating motors.

In particular, the transmission mechanism between an motor part and a joint part consist of flexible and inextensible transmission devices that connect the joint pulleys rigidly coupled with the rotating motors and the joint pulley. These transmission devices can be chosen among:

a timing belt;
a friction belt;
a closed wire;
a chain.

In its preferred form, the flexible transmission devices include a timing belt that joins the motor pulleys and the joint pulley having an externally timing cylindrical surface in order to match up with the timing belt.

Preferably, the mechanism of motion transfer between a motor part and a joint part incorporates devices for tensioning these flexible transmission devices reacting elastically to the variations of the angle of torsion, thereby varying the mechanical impedance of the transmission mechanism.

In particular, the devices for tensioning the transmission devices employ at least one device, the so-called "tensioner", comprising:

an idle pulley that can rotate in contact with the transmission mechanisms;

a prismatic element that slides along its axis in a guide fixed to a frame, being elastically preloaded and presenting an extremity connected to the idle pulley.

In an alternative form, the devices to decrease the mechanical impedance during the phase of substantially uniform motion can be chosen among:

an electromechanical clutch;
a particle clutch;
a transmission presenting a variable damping that uses magneto-rheological fluids;

whose maximum transmissible torque varies as a function of electric/magnetic controllable input signals.

In particular, the transmission with variable viscosity includes:

a bladed rotor rigidly coupled to the motor part;

a rotating chamber that is internally timing and rigidly joined to the joint shaft of the moving part, inside which the bladed rotor can rotate;

a magneto-rheological fluid, placed inside the rotating chamber, capable of varying its viscosity due to variations of a magnetic field generated externally to the rotating chamber;

devices for creating and varying in a rapid and controllable manner a magnetic field external to the rotating chamber.

Preferably, the devices for creating and varying the external magnetic field include a solenoid externally wrapped around the rotating chamber.

In a second alternative form, the devices for decreasing the mechanical impedance during the phase of substantially uniform motion include a transmission mechanism with a continuously variable gear ratio.

In particular, the transmission mechanism with a continuously variable gear ratio includes a joint pulley and a motor pulley, both with a variable radius, in which variations of these the two radiuses produce the variation of the gear ratio.

Preferably, the transmission mechanism is capable of modifying the effective inertia at the main axis as a function of the velocity of the joint axis, directly influencing the entity of damage produced in the event of impact, and generating high torques in the acceleration phases and low reflected inertia in the high velocity phases.

Shown in FIG. 1 is a realized preferred form of a mechanism of motion transfer with variable mechanical impedance that combines the motion of two independently controlled motors in order to obtain control of both the motion and the rigidity and, therefore, of the impedance of the joint shaft 10.

The mechanism comprises two motor pulleys 2 and 3, with timing cylindrical surfaces, rigidly connected to two electric motors 42 and 43, and including a first stage of reduction if needed, and a third pulley 1 with timing cylindrical surface rigidly connected to the joint shaft 10.

The three pulleys 1, 2 and 3 are set to work on a timing belt 4 that is flexible but inextensible. The belt, of suitable length, is kept in tension by three tensioners 20, 21, and 22, each one including an idle pulley. The pulleys are indicated respectively with 23, 24, and 25. Each pulley is allowed to displace radially due to a sustaining body, respectively indicated as 26, 28 and 30, and is elastically preloaded with the respective springs 27, 29 and 31, in which the movement is allowed due to the respective prismatic guides 32, 33 and 34. The axes of rotation of both the pulleys and the prismatic guides are rigidly linked to a base 40. The angle of torsion of the belt 4 in the spatial segment placed between the right motor pulley 3 and the main pulley 1, fastened to the position of the corresponding lateral tensioner 21, determines with the motors at rest the effective rigidity of the joint part rigidly linked to pulley 1 for small counter-clockwise torsional displacements from the equilibrium configuration. More acute angles of belt 4 in that tract correspond, in fact, to lower rigidities. Analogous considerations hold true for the left tensioner 20. The rear tensioner 22 has the function of recovering the backlash along the length of belt 4. The tensioning system of the belt can be realized in different ways from the one described, with three equivalent deformable tensioning elements. In-phase angular variations of motor pulleys 2 and 3 generate an angular displacement from the equilibrium position on the joint shaft 10, while out-of-phase angular variations produce variations of the rigidity of the joint shaft 10.

Figure 2:
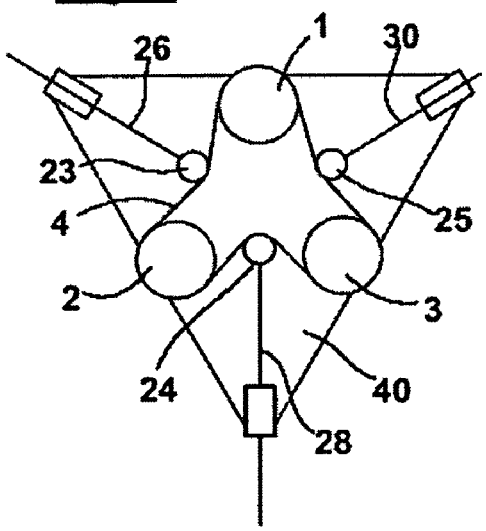
FIGS. 2 and 3 show two different configurations of the mechanism.
Figure 3:
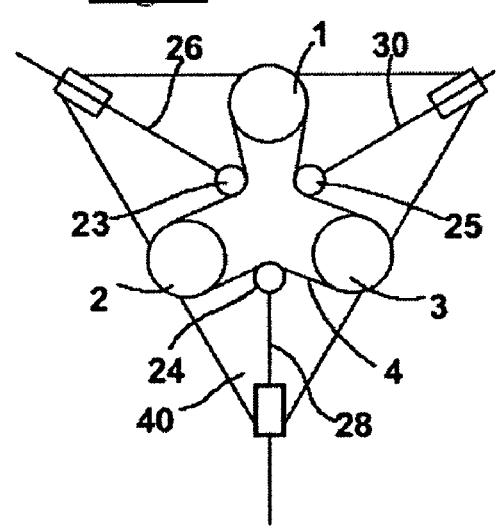

Illustrated in FIGS. 2 and 3 is the functioning principle of the mechanism, corresponding to two configurations in which the equilibrium position of the equilibrium of the joint shaft is the same, but with a different rigidity.

In particular, in FIG. 2 the mechanism has a high rigidity. The maximum rigidity of the mechanism is obtained when the parts of the belt placed between joint pulley 1 and motor pulleys 2 and 3 are straight.

In FIG. 3, instead, the device has a high compliance. The maximum compliance is obtained when the part of the belt placed between the two motor pulleys 2 and 3 is straight.

Figure 4:
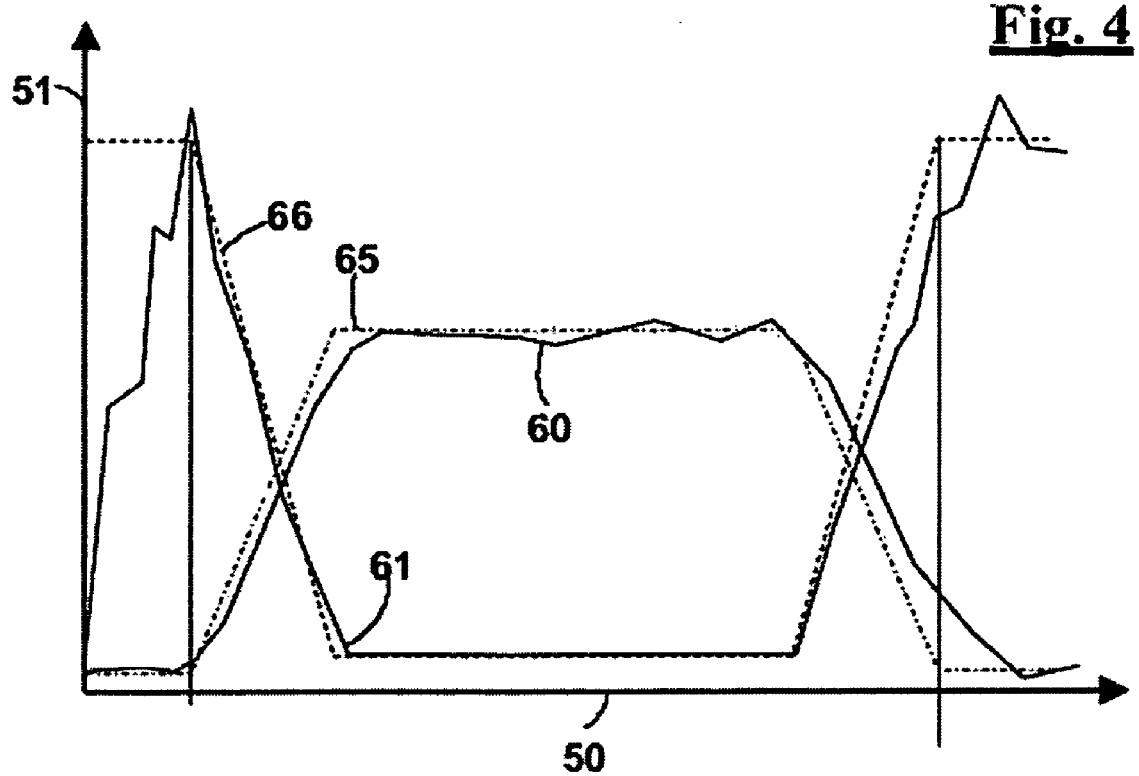
FIG. 4 shows a graph that describes both behaviors of joint velocity and stiffness of the transmission mechanism as a function of time.

The graphs reported in FIG. 4 show that the angular velocities of the joint axis and the mechanical rigidity of the transmission for the described mechanism in FIG. 1 have the possibility of varying independently. In particular, time is reported on the Abscissa axis 50, while the angular velocity 60 and mechanical rigidity 61 are reported on the Ordinate axis 51 together with the predicted theoretical curves 65 and 66.

Figure 5:
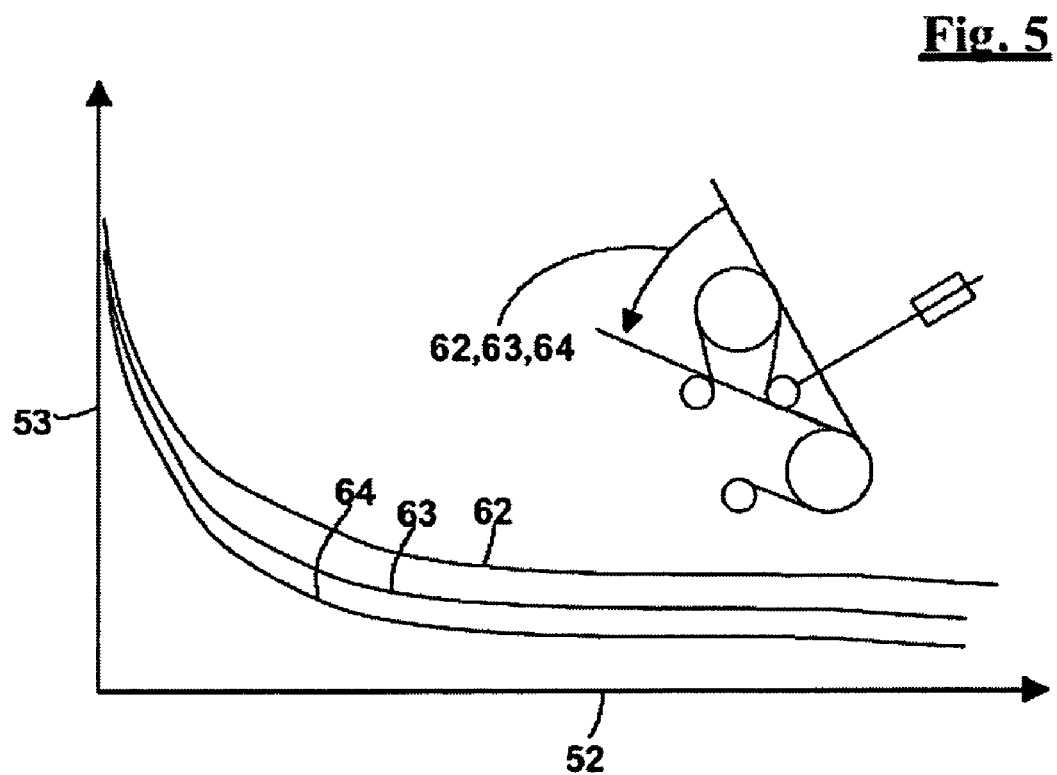
FIG. 5 shows a graph that relates the rigidity of the transmission with the working angle of the belt.

FIG. 5 shows in a graph the behavior of the inclination angle of the belt with respect to the tangent to a motor pulley and a joint pulley, as a function of the mechanical stiffness of the transmission. In particular, three curves are reported respectively from 62 to 64 when values of transmission stiffness are increasing, showing the behavior of the position of the joint shaft (ordinate axis) when values of the payload at the joint shaft (abscissa axis) are increasing.

Figure 6:
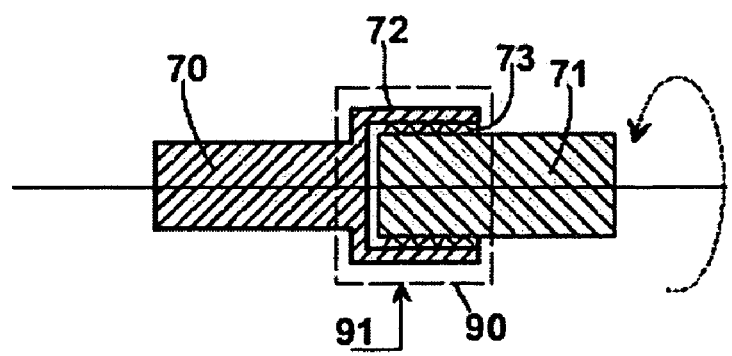
FIG. 6 shows schematically, in section, an alternative preferable form of the mechanism, which utilizes magneto-rheological fluids.

FIG. 6 schematically shows in section the functioning principle of a second realized form of the mechanism with variable impedance. Pictured are a motor shaft 70 and a joint shaft 71. The rotating shafts 70 and 71 are connected through a rotating kinematic coupling 90 whose impedance is varied through the variation of the friction of a material 73 interposed between the surfaces of the a kinematic coupling. The variation is regulated by modifying values of a controller variable 91, for example, tension.

Figure 7:
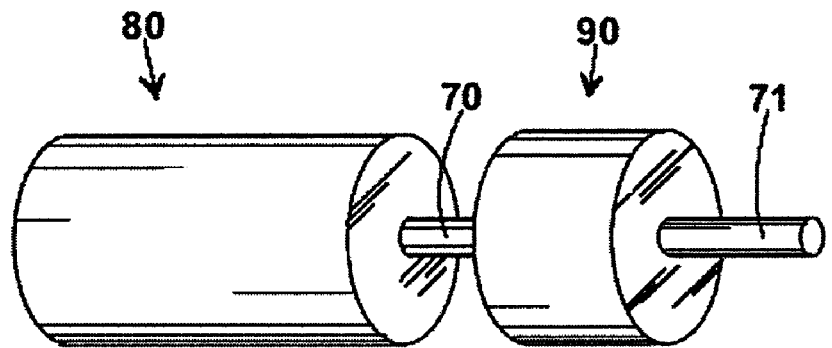
FIG. 7 shows the assembly of the device on the axis of a rotating motor.

FIG. 7 shows a scheme of the device 90 assembled on the shaft 70 of a rotating motor 80, or of a reduction gear connected to shaft 70. The device 90 can be an electromagnetic brake, a magnetic-particle clutch or a magneto-rheological clutch.

Figure 8:
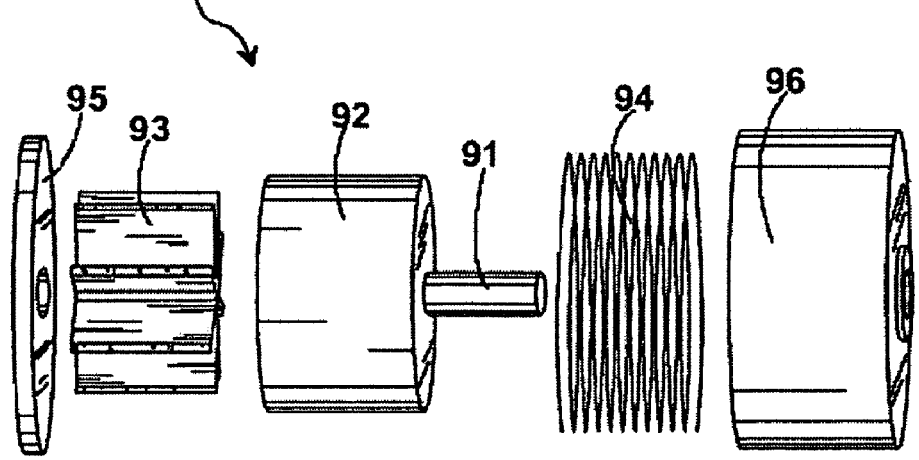
FIG. 8 shows a blown-up drawing of the device.

Shown in FIG. 8 is an exploded view of the second realized form in which the transmission mechanism 90 is of the variable viscosity type. A possible realization of the transmission type uses magneto-rheological fluids, that is, fluids whose rheological characteristics, or viscoelastic plasticity, varies as a function of the magnetic field in which it operates. The transmission is composed of a bladed rotor 93, rigidly coupled to the motor shaft 81, and of a rotating chamber 92, suitably bladed on the internal surface and rigidly coupled to the joint shaft 91. The chamber is closed by a suitable seal and sustained by ball bearings, not shown in the figure. Outside the rotating chamber 92, realized in paramagnetic or diamagnetic material, solenoid 94 is positioned for the generation of a magnetic field through which it is possible to control the rheological characteristics of the fluid. The device is protected by an external envelope comprising a case 96 and a covering 95.

Analogous devices are easily conceivable adopting other physical principles, such as, for example, those governing the electro-rheological fluids.

In this device the variation of rotational impedance of the joint shaft is obtained directly through the variation of the characteristics of the coupling with the main shaft. Also, in this case, the application of the concept of transformation with variable impedance provides the high visco-plastic coupling in the phases of acceleration and deceleration, while the phases at high velocity of the joint axis will be characterized by low visco-plastic coupling. Despite the fact that this device belongs to the same family of transmission devices with variable impedance, its functioning differs from the one described in FIG. 1 in how it can be viewed as a mechanical transformer of the velocity of the main shaft into the force at the joint shaft with a trans-resistive variable characteristic.

Figure 9:
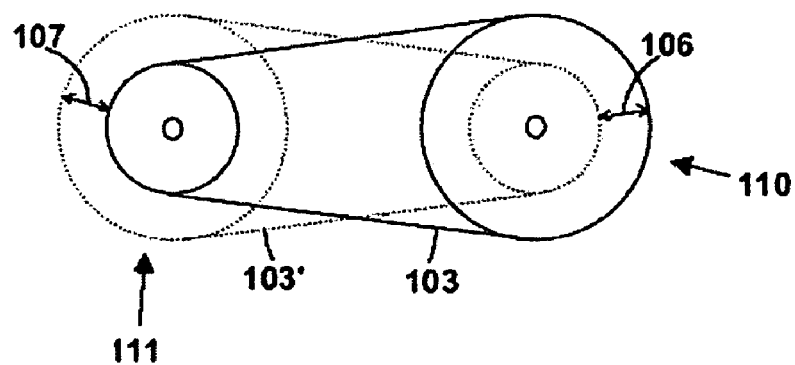
FIG. 9 shows a second realized form of the transmission mechanism with variable impedance, which utilizes a mechanism with a gear ratio variable with velocity.
Figure 10:
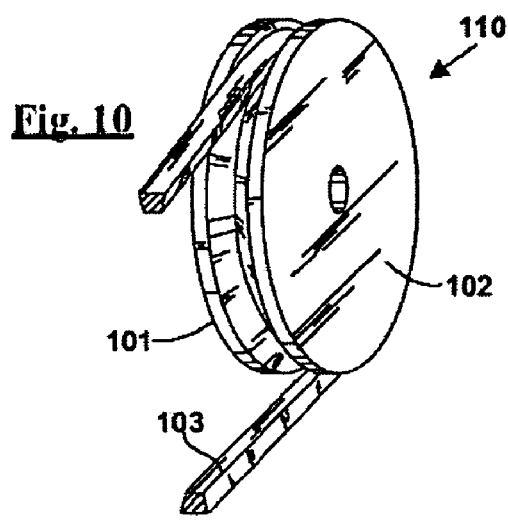
FIG. 10 shows a perspective view of a part of the mechanism, comprising a pulley with a variable radius.
Figure 11:
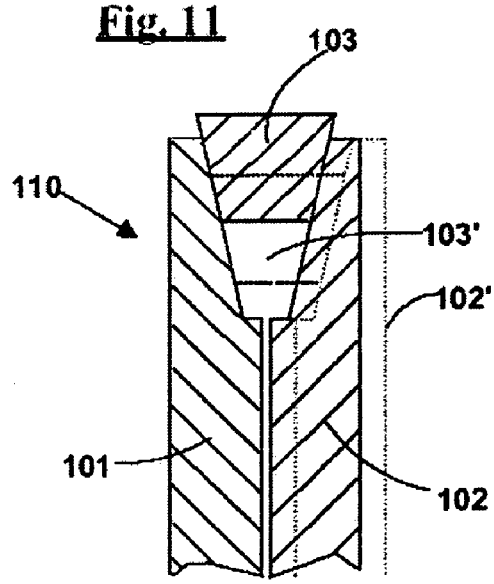
FIG. 11 shows, in partial section, two configurations of the a mechanism, assumed to be at different rotating velocities.

FIGS. 9 to 11 describe a third realized form of the transmission mechanism with variable impedance, which uses a transmission mechanism with a gear ratio variable with continuity. Any mechanism for the continuous variation of gear ratio is, in principle, suitable to this purpose.

In particular, in FIG. 9 two devices are used with continuously variable ratio 110 and 111 connected by a belt 103. The variation of the gear ratio occurs by modifying the radius of the motor pulley 110 and of the joint pulley 111 by the quantities indicated respectively with 106 and 107 in the figure, in such a way to obtain high ratios for minimum motor radii and maximum joint radii, or vice-versa in the case of low ratios. The particular configuration of the mechanism also allows different arrangements of the belt from configuration 103 to 103', varying the radius of the two pulleys 110 and 111.

FIG. 10 shows a perspective view of a pulley with variable radius 110. This consists of two coaxial juxtaposing half-pulleys 101 and 102, both carved to a "V" shape. Varying the distance between the two half-pulleys, the radius of the notch of the pulley varies and, therefore, the curvature radius of the belt 103.

An axial section is represented in FIG. 11 device 110, as described in FIG. 10. The distanced position 102' from the half-pulley 102 and the corresponding position 103' of belt 103 are distinguishable for different values of distance between the half-pulleys.

The description given above of a specific achievable form is capable of showing the invention from the conceptual point-of-view so that others, using the mentioned technique, can modify and/or adapt in various applications the specific achievable form without further research and without moving away from the inventive concept, and, therefore, it is intended that the adaptations and modifications will be considered equivalent to the exemplified achievable form. The devices and materials to realize the various described functions can be different in nature without leaving the scope of the present invention. It is intended that the expressions or the terminology used have a purely descriptive aim and therefore not limiting.

What is claimed is:

1. A transmission mechanism, comprising;
    a first rotating pulley;
    a first pulley motor coupled to said first rotating pulley;
    a transmission device coupled to said first rotating pulley;
    a second rotating pulley coupled to said first rotating pulley by said transmission device to rotate in response to rotation of said first rotating pulley, said first and second rotating pulleys and said transmission device having a stiffness;
    a tensioner system that varies said stiffness in a continuous range to a level that still allows said second rotating pulley to rotate in response to rotation of said first rotating pulley;
    a third rotating pulley coupled to said first and second pulleys by said transmission device; and,
    a third pulley motor coupled to said third rotating pulley, said first and third pulley motors being operated to vary said stiffness of said transmission device.

2. The mechanism of claim 1, wherein said transmission device has an angle of torsion and said tensioner system varies said angle of torsion to vary said stiffness.

3. The mechanism of claim 1, wherein said tensioner system includes first, second and third tensioners, said first and second tensioners move in an outward direction while said third tensioner moves in an inward direction.

4. The mechanism of claim 1, wherein said transmission device includes a belt.

5. The mechanism of claim 1, wherein said tensioner system includes a plurality of tensioners that each include a movable pulley that interacts with said transmission device.

* * * * *